(12) United States Patent
Carpintero et al.

(10) Patent No.: US 10,788,179 B2
(45) Date of Patent: *Sep. 29, 2020

(54) ARTIFICIAL CANDLE WITH MOVEABLE PROJECTION SCREEN POSITION

(71) Applicant: Sterno Home Inc., Vancouver (CA)

(72) Inventors: Carlos Carpintero, Delson (CA); Lucian Hurduc, Ste-Julie (CA); Carl Marinier, Sainte-Catherine (CA)

(73) Assignee: STERNO HOME INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,939

(22) Filed: Jan. 14, 2020

(65) Prior Publication Data

US 2020/0149696 A1    May 14, 2020

Related U.S. Application Data

(63) Continuation of application No. 16/460,761, filed on Jul. 2, 2019, now Pat. No. 10,578,264, which is a
(Continued)

(51) Int. Cl.
*F21S 10/04* (2006.01)
*F21S 6/00* (2006.01)
(Continued)

(52) U.S. Cl.
CPC .............. *F21S 10/046* (2013.01); *F21S 6/001* (2013.01); *F21S 9/02* (2013.01); *F21V 11/18* (2013.01);
(Continued)

(58) Field of Classification Search
CPC . F21S 10/046; F21S 6/001; F21S 9/02; H05B 47/16; H05B 45/10; F21V 11/18;
(Continued)

(56) References Cited

U.S. PATENT DOCUMENTS

| 212,401 A | 2/1879 | Requa |
| 643,493 A | 2/1900 | Fuller |

(Continued)

FOREIGN PATENT DOCUMENTS

| CA | 2877700 | 12/2015 |
| CN | 2499694 Y | 7/2002 |

(Continued)

OTHER PUBLICATIONS

"12v ac party lights," thefind, retrieved from the internet on Jan. 26, 2011. (4 pages).

(Continued)

*Primary Examiner* — Mary Ellen Bowman
(74) *Attorney, Agent, or Firm* — McAndrews, Held & Malloy, Ltd.

(57) ABSTRACT

A flameless candle includes: a candle body forming an interior region, wherein the candle body includes an upper surface and an aperture in the upper surface; a light source positioned in the interior region of the candle body; a force-inducing portion configured to alternatively induce a first mechanical force and a second mechanical force; and a projection screen. The projection screen is configured to receive the first mechanical force and responsively move to a first position and receive the second mechanical force and responsively move to a second position. When the projection screen is moved to the second position, the light source is automatically energized such that a light is emitted onto the projection screen. When the projection screen is moved to the first position, the light source is automatically de-energized such that the light is not emitted.

11 Claims, 8 Drawing Sheets

Related U.S. Application Data continuation of application No. 16/123,351, filed on Sep. 6, 2018, now Pat. No. 10,352,517.

(60) Provisional application No. 62/555,154, filed on Sep. 7, 2017.

(51) Int. Cl.

| | | |
|---|---|---|
| *F21S 9/02* | (2006.01) | |
| *F21V 23/04* | (2006.01) | |
| *F21V 11/18* | (2006.01) | |
| *F21V 14/06* | (2006.01) | |
| *H05B 45/10* | (2020.01) | |
| *H05B 47/16* | (2020.01) | |
| *F21Y 115/10* | (2016.01) | |
| *F21W 121/00* | (2006.01) | |

(52) U.S. Cl.
CPC .......... *F21V 14/06* (2013.01); *F21V 23/0442* (2013.01); *H05B 45/10* (2020.01); *H05B 47/16* (2020.01); *F21W 2121/00* (2013.01); *F21Y 2115/10* (2016.08)

(58) Field of Classification Search
CPC .. F21V 14/06; F21V 23/0442; F21Y 2115/10; F21W 2121/00
See application file for complete search history.

(56) References Cited

U.S. PATENT DOCUMENTS

| | | |
|---|---|---|
| 838,075 A | 12/1906 | Brown |
| 1,736,820 A | 11/1929 | Black |
| 1,824,388 A | 9/1931 | Birch |
| 1,893,730 A | 1/1933 | Charles |
| 2,131,410 A | 9/1938 | Newton |
| 2,278,816 A | 4/1942 | Zabel |
| 2,435,811 A | 2/1948 | Waters |
| 2,811,711 A | 10/1957 | Cade |
| 2,935,041 A | 5/1960 | Rovere |
| 2,976,450 A | 3/1961 | Benoliel |
| 3,127,539 A | 3/1964 | Covertine |
| 3,150,709 A | 9/1964 | Bolmgren |
| 3,233,093 A | 2/1966 | Gerlat |
| 3,315,497 A | 4/1967 | Macdonald |
| 3,384,774 A | 5/1968 | English |
| 3,413,458 A | 11/1968 | Barefoot |
| 3,435,286 A | 3/1969 | Kayatt |
| 3,514,660 A | 5/1970 | Kopelman |
| 3,639,749 A | 2/1972 | Beckman |
| 3,681,588 A | 8/1972 | Lee |
| 3,710,182 A | 1/1973 | Reenan |
| 3,749,904 A | 7/1973 | Graff |
| 3,814,973 A | 6/1974 | Thouret |
| 3,890,085 A | 6/1975 | Andeweg |
| 3,978,598 A | 9/1976 | Rose |
| 4,026,544 A | 5/1977 | Plambeck |
| 4,107,763 A | 8/1978 | Thiel |
| 4,253,045 A | 2/1981 | Weber |
| 4,328,534 A | 5/1982 | Abe |
| 4,381,455 A | 4/1983 | Komori |
| 4,477,249 A | 10/1984 | Ruzek |
| 4,510,556 A | 4/1985 | Johnson |
| 4,550,363 A | 10/1985 | Sandell |
| 4,551,794 A | 11/1985 | Sandell |
| 4,593,232 A | 6/1986 | Mcedwards |
| 4,617,614 A | 10/1986 | Lederer |
| 4,777,571 A | 10/1988 | Morgan |
| 4,839,780 A | 6/1989 | Chuan |
| 4,866,580 A | 9/1989 | Blackerby |
| 4,965,707 A | 10/1990 | Butterfield |
| 5,090,892 A | 2/1992 | Chuang |
| 5,097,180 A | 3/1992 | Ignon |
| 5,381,325 A | 1/1995 | Messana |
| 5,503,550 A | 4/1996 | DePalma |
| 5,575,274 A | 11/1996 | DePalma |
| 5,600,209 A | 2/1997 | St Louis |
| 5,642,580 A | 7/1997 | Hess |
| 5,707,282 A | 1/1998 | Clements |
| 5,848,886 A | 12/1998 | Michaud |
| 5,858,036 A | 1/1999 | Chandaria |
| 5,924,784 A | 7/1999 | Chliwnyj |
| 6,017,139 A | 1/2000 | Lederer |
| 6,047,489 A | 4/2000 | Hess |
| 6,050,011 A | 4/2000 | Hess |
| 6,053,795 A | 4/2000 | Whitney |
| 6,064,064 A | 5/2000 | Castleman |
| 6,066,924 A | 5/2000 | Lederer |
| RE37,168 E | 5/2001 | St. Louis |
| 6,241,362 B1 | 6/2001 | Morrison |
| 6,257,755 B1 | 7/2001 | Sevelle |
| 6,269,567 B1 | 8/2001 | MacPherson |
| 6,302,555 B1 | 10/2001 | Bristow |
| 6,312,137 B1 | 11/2001 | Hsieh |
| 6,363,636 B1 | 4/2002 | Hess |
| 6,385,881 B1 | 5/2002 | Hess |
| 6,454,425 B1 | 9/2002 | Lin |
| 6,461,011 B1 | 10/2002 | Harrison |
| 6,511,219 B2 | 1/2003 | Sevelle |
| 6,515,283 B1 | 2/2003 | Castleman |
| 6,518,574 B1 | 2/2003 | Castleman |
| 6,564,485 B1 | 5/2003 | Hess |
| 6,575,613 B2 | 6/2003 | Brown |
| 6,615,519 B2 | 9/2003 | Hess |
| 6,616,308 B2 | 9/2003 | Jensen |
| D486,924 S | 2/2004 | Skradski |
| 6,688,752 B2 | 2/2004 | Moore |
| 6,712,493 B2 | 3/2004 | Tell |
| 6,719,443 B2 | 4/2004 | Gutstein |
| 6,757,487 B2 | 6/2004 | Martin |
| 6,799,727 B2 | 10/2004 | Webster |
| 6,871,221 B1 | 3/2005 | Styles |
| 6,914,534 B2 | 7/2005 | Tanguay |
| 6,916,110 B2 | 7/2005 | Bastiste |
| 6,926,423 B2 | 8/2005 | Bucher |
| 6,929,380 B2 | 8/2005 | Logan |
| 6,944,982 B2 | 9/2005 | Schroeter |
| 6,953,401 B2 | 10/2005 | Starr |
| 6,955,440 B2 | 10/2005 | Niskanen |
| 6,966,665 B2 | 11/2005 | Limburg |
| 6,976,063 B1 | 12/2005 | Dharmarajan |
| 7,011,426 B2 | 3/2006 | Gabor |
| 7,029,146 B2 | 4/2006 | Kitchen |
| 7,030,748 B2 | 4/2006 | Tanguay |
| 7,066,637 B2 | 6/2006 | Nozawa |
| 7,080,472 B2 | 7/2006 | Schroeter |
| 7,083,315 B2 | 8/2006 | Hansler |
| 7,093,949 B2 | 8/2006 | Hart |
| 7,093,961 B2 | 8/2006 | Bentley |
| 7,111,421 B2 | 9/2006 | Corry |
| 7,125,142 B2 | 10/2006 | Wainwright |
| 7,134,229 B2 | 11/2006 | Hess |
| 7,159,994 B2 | 1/2007 | Schnuckle |
| 7,162,820 B2 | 1/2007 | Hess |
| 7,194,830 B2 | 3/2007 | Hess |
| 7,201,500 B2 | 4/2007 | Mishan |
| 7,210,256 B2 | 5/2007 | Rosserot |
| 7,261,455 B2 | 8/2007 | Scnuckle |
| 7,300,179 B1 | 11/2007 | LaDuke |
| 7,350,720 B2 | 4/2008 | Jaworski |
| 7,360,935 B2 | 4/2008 | Jensen |
| 7,373,743 B1 | 5/2008 | Hess |
| 7,377,667 B2 | 5/2008 | Richmond |
| 7,422,355 B2 | 9/2008 | Hirata |
| 7,481,571 B2 | 1/2009 | Bistritzky |
| 7,503,668 B2 | 3/2009 | Porchia |
| 7,670,035 B2 | 3/2010 | Tsai |
| 7,686,471 B2 | 3/2010 | Reichow |
| 7,726,860 B2 | 6/2010 | Harrity |
| 7,762,897 B2 | 7/2010 | Starr |
| 7,832,906 B2 | 11/2010 | Damman |
| 7,837,355 B2 | 11/2010 | Schnuckle |
| 7,997,772 B2 | 8/2011 | Avtzon |

(56) References Cited

U.S. PATENT DOCUMENTS

| | | |
|---|---|---|
| 8,021,021 B2 | 9/2011 | Paolini |
| 8,070,319 B2 | 12/2011 | Schnuckle |
| 8,132,936 B2 | 3/2012 | Patton |
| 8,234,803 B2 | 8/2012 | Gallo |
| 8,534,869 B2 | 9/2013 | Patton |
| 8,550,660 B2 | 10/2013 | Patton |
| 9,068,706 B2 | 6/2015 | Fournier |
| 9,074,759 B2 | 7/2015 | Lai |
| 9,279,552 B2 | 3/2016 | Ding |
| 9,551,470 B2 | 1/2017 | Li |
| 9,664,349 B1 | 5/2017 | Hurduc |
| 9,719,643 B1 | 8/2017 | Cheng |
| 10,352,517 B2 | 7/2019 | Carpintero |
| 2001/0033488 A1 | 10/2001 | Chliwnyj |
| 2002/0011570 A1 | 1/2002 | Castleman |
| 2002/0023376 A1 | 2/2002 | Hess |
| 2002/0080601 A1 | 6/2002 | Meltzer |
| 2002/0093834 A1 | 7/2002 | Yu |
| 2002/0139021 A1 | 10/2002 | Hess |
| 2002/0175215 A1 | 11/2002 | Webster |
| 2003/0035291 A1 | 2/2003 | Jensen |
| 2003/0041491 A1 | 3/2003 | Mix |
| 2003/0046837 A1 | 3/2003 | Hess |
| 2003/0053305 A1 | 3/2003 | Lin |
| 2003/0081420 A1 | 5/2003 | Jensen |
| 2003/0110671 A1 | 6/2003 | Hess |
| 2003/0161145 A1 | 8/2003 | Liu |
| 2003/0198045 A1 | 10/2003 | Kitchen |
| 2004/0037069 A1 | 2/2004 | Blackbourn |
| 2004/0060213 A1 | 4/2004 | Schroeter |
| 2004/0095253 A1 | 5/2004 | Tanguay |
| 2004/0114351 A1 | 6/2004 | Stokes |
| 2004/0165374 A1 | 8/2004 | Robinson |
| 2004/0165383 A1 | 8/2004 | Hess |
| 2004/0181983 A1 | 9/2004 | Hess |
| 2004/0240225 A1 | 12/2004 | Batiste |
| 2004/0246711 A1 | 12/2004 | Brenchley |
| 2004/0252498 A1 | 12/2004 | Gutstein |
| 2004/0264169 A1 | 12/2004 | Limburg |
| 2005/0072031 A1 | 4/2005 | Hess |
| 2005/0083682 A1 | 4/2005 | Logan |
| 2005/0086841 A1 | 4/2005 | Schroeter |
| 2005/0097792 A1 | 5/2005 | Naden |
| 2005/0097793 A1 | 5/2005 | Hess |
| 2005/0151663 A1 | 7/2005 | Tanguay |
| 2005/0169666 A1 | 8/2005 | Porchia |
| 2005/0196716 A1 | 9/2005 | Haab |
| 2005/0248952 A1 | 11/2005 | Yao |
| 2005/0254232 A1 | 11/2005 | Bentley |
| 2005/0254242 A1 | 11/2005 | Baker |
| 2005/0285538 A1 | 12/2005 | Jaworski |
| 2006/0026894 A1 | 2/2006 | Hess |
| 2006/0034079 A1 | 2/2006 | Schnuckle |
| 2006/0034100 A1 | 2/2006 | Schnuckle |
| 2006/0098428 A1 | 5/2006 | Rosserot |
| 2006/0101681 A1 | 5/2006 | Hess |
| 2006/0109666 A1 | 5/2006 | Tsai |
| 2006/0146544 A1 | 7/2006 | Leung |
| 2006/0188831 A1 | 8/2006 | Hess |
| 2006/0232958 A1 | 10/2006 | Chang |
| 2007/0002560 A1 | 1/2007 | Gutstein |
| 2007/0014107 A1 | 1/2007 | Mishan |
| 2007/0094903 A1 | 5/2007 | Hess |
| 2007/0107280 A1 | 5/2007 | Stinson |
| 2007/0125367 A1 | 6/2007 | Lim |
| 2007/0127249 A1 | 6/2007 | Medley |
| 2007/0159422 A1 | 7/2007 | Blandino |
| 2007/0177393 A1 | 8/2007 | Hirata |
| 2007/0177394 A1 | 8/2007 | Vock |
| 2007/0207424 A1 | 9/2007 | Benson |
| 2007/0224561 A1 | 9/2007 | Hess |
| 2007/0236947 A1 | 10/2007 | Jensen |
| 2007/0242259 A1 | 10/2007 | Kawakami |
| 2008/0004124 A1 | 1/2008 | O'Neill |
| 2008/0013931 A1 | 1/2008 | Bourne |
| 2008/0031784 A1 | 2/2008 | Bistritzky |
| 2008/0037254 A1 | 2/2008 | O'Neill |
| 2008/0074875 A1 | 3/2008 | Jensen |
| 2008/0094825 A1 | 4/2008 | Silver |
| 2008/0112154 A1 | 5/2008 | Reichow |
| 2008/0117634 A1 | 5/2008 | Wong |
| 2008/0129226 A1 | 6/2008 | Dewitt |
| 2008/0130266 A1 | 6/2008 | Dewitt |
| 2008/0138050 A1 | 6/2008 | Moreland |
| 2008/0151534 A1 | 6/2008 | Lin |
| 2008/0151563 A1 | 6/2008 | Chen |
| 2008/0151571 A1 | 6/2008 | Chen |
| 2008/0158863 A1 | 7/2008 | Tsai |
| 2009/0135586 A1 | 5/2009 | Yang |
| 2009/0310340 A1 | 12/2009 | Betz |
| 2010/0001662 A1 | 1/2010 | Nelkin |
| 2010/0073924 A1 | 3/2010 | Deng |
| 2010/0254155 A1 | 10/2010 | Capo |
| 2011/0121726 A1 | 5/2011 | Erchak |
| 2011/0127914 A1 | 6/2011 | Patton |
| 2011/0148329 A1 | 6/2011 | Demarest |
| 2011/0182065 A1 | 7/2011 | Negley |
| 2011/0279034 A1 | 11/2011 | Lucas |
| 2012/0155075 A1 | 6/2012 | Asofsky |
| 2013/0050985 A1 | 2/2013 | Kwok |
| 2013/0100686 A1 | 4/2013 | Patton |
| 2016/0109083 A1 | 4/2016 | Li |
| 2017/0023196 A1 | 1/2017 | Li |
| 2017/0082255 A1 | 3/2017 | Bentley |
| 2017/0130918 A1 | 5/2017 | Li |
| 2017/0167677 A1 | 6/2017 | Patton |
| 2017/0211767 A1 | 7/2017 | Baeza |
| 2019/0063703 A1 | 2/2019 | Hurduc |

FOREIGN PATENT DOCUMENTS

| | | |
|---|---|---|
| CN | 2562059 Y | 7/2003 |
| CN | 1578573 A | 2/2005 |
| CN | 1650130 A | 8/2005 |
| CN | 2747446 Y | 12/2005 |
| CN | 2755407 Y | 2/2006 |
| CN | 2769684 A | 4/2006 |
| CN | 2775459 Y | 4/2006 |
| CN | 2781708 Y | 5/2006 |
| CN | 2828532 Y | 10/2006 |
| CN | 2859207 Y | 1/2007 |
| CN | 2906310 Y | 5/2007 |
| CN | 200979085 Y | 11/2007 |
| CN | 200999983 Y | 1/2008 |
| CN | 201000054 Y | 1/2008 |
| CN | 201034248 Y | 3/2008 |
| CN | 201034303 Y | 3/2008 |
| CN | 201053583 Y | 4/2008 |
| CN | 201066077 Y | 5/2008 |
| CN | 201069056 Y | 6/2008 |
| CN | 201137821 Y | 10/2008 |
| CN | 101865413 A | 10/2010 |
| DE | 1489617 A1 | 5/1969 |
| DE | 9307061 U1 | 10/1993 |
| DE | 9414191 U1 | 12/1994 |
| EP | 0138786 A1 | 4/1985 |
| EP | 0600217 A1 | 6/1994 |
| EP | 1199524 A2 | 2/2002 |
| EP | 1199525 A2 | 2/2002 |
| EP | 1199526 A2 | 2/2002 |
| EP | 1199527 A2 | 2/2002 |
| EP | 1223385 A1 | 7/2002 |
| EP | 1223385 B1 | 7/2002 |
| EP | 1313987 B1 | 5/2003 |
| EP | 1328761 A2 | 7/2003 |
| EP | 1878449 A1 | 2/2004 |
| EP | 1137900 B1 | 3/2004 |
| EP | 1427968 A1 | 6/2004 |
| EP | 1427968 B1 | 6/2004 |
| EP | 1439351 A2 | 7/2004 |
| EP | 1439351 A3 | 7/2004 |
| EP | 1496306 A2 | 7/2004 |
| EP | 1800064 A2 | 10/2004 |
| EP | 1488447 A2 | 12/2004 |

(56) References Cited

FOREIGN PATENT DOCUMENTS

| | | |
|---|---|---|
| EP | 1869360 A1 | 3/2005 |
| EP | 1938018 A1 | 9/2005 |
| EP | 1655543 A1 | 5/2006 |
| EP | 1659340 A2 | 5/2006 |
| EP | 1659340 A3 | 7/2006 |
| EP | 1703210 A1 | 9/2006 |
| EP | 1703211 A1 | 9/2006 |
| EP | 1936277 A2 | 12/2006 |
| EP | 1797371 A1 | 6/2007 |
| EP | 1832815 A2 | 9/2007 |
| EP | 1838110 A1 | 9/2007 |
| EP | 1939003 A1 | 7/2008 |
| EP | 2587127 A1 | 6/2010 |
| EP | 2290290 A1 | 3/2011 |
| GB | 2323159 A1 | 9/1998 |
| GB | 2350885 A1 | 12/2000 |
| GB | 2379731 A | 3/2003 |
| GB | 2438519 A | 11/2007 |
| GB | 2457485 A | 8/2009 |
| JP | H0652709 A | 2/1994 |
| JP | 2000284730 A1 | 10/2000 |
| JP | 2008180755 A | 8/2008 |
| WO | 1982002756 A1 | 8/1982 |
| WO | 1987004506 A1 | 7/1987 |
| WO | 1995004243 A1 | 2/1995 |
| WO | 1996025624 A1 | 8/1996 |
| WO | 1997028671 A1 | 8/1997 |
| WO | 1997041393 A1 | 11/1997 |
| WO | 1998005014 A1 | 2/1998 |
| WO | 2001004544 A1 | 1/2001 |
| WO | 2001057447 A1 | 8/2001 |
| WO | 03/023286 A1 | 9/2001 |
| WO | 2002035153 A2 | 5/2002 |
| WO | 02/018841 A3 | 9/2002 |
| WO | 2002099338 A1 | 12/2002 |
| WO | 03/073466 A2 | 9/2003 |
| WO | 2005/045321 A1 | 11/2003 |
| WO | 2004063625 A2 | 7/2004 |
| WO | 2006/020839 A2 | 8/2004 |
| WO | 2005/003623 A2 | 1/2005 |
| WO | 2005/038338 A1 | 4/2005 |
| WO | 2006/040342 A2 | 4/2006 |
| WO | 2006027273 A1 | 4/2006 |
| WO | 2006074544 A1 | 7/2006 |
| WO | 2006104898 A1 | 10/2006 |
| WO | 2006105703 A1 | 10/2006 |
| WO | 2007039126 A1 | 4/2007 |
| WO | 2007/120540 A1 | 10/2007 |
| WO | 2007141013 A1 | 12/2007 |
| WO | 2007147887 A2 | 12/2007 |
| WO | 2008/060800 A2 | 5/2008 |
| WO | 2008062061 A2 | 5/2008 |
| WO | 2008/073786 A2 | 6/2008 |
| WO | 2008/076326 A2 | 6/2008 |
| WO | 2012/000418 A1 | 1/2012 |
| WO | 2018/104788 A1 | 6/2018 |

OTHER PUBLICATIONS

2010 Updated Speeder's Faux Flaming Caldron, Halloween Forum. com, retrieved from the Internet on Jan. 26, 2011). (2 pages).
"Faux Flame With Housing," thefind, retrieved from the Internet on Jan. 26, 2011. (2 pages).
"Flame Effect Light," Twenga, retrieved from the Internet on Jan. 26, 2011. (3 pages).
"Home Stove Stage Silk Flame Effect Light Lamp Fire Fake," Shopzilla.co.uk, retrieved from the internet on Jan. 26, 2011.(6 pages).
Mini Hanging Fire Bowl by Visual Effects; from Amazon.com, retrieved from the Internet on Jan. 26, 2011 (3 pages).
"New Blue Faux Flame Safe Halloween Pumpkin LED Candle" by Unknown, from Amazon.com, retrieved from the Internet on Jan. 26, 2011. (3 pages).
"Sensor LED 7 Color Change Flameless Candle light," Diwali, e-bay, retrieved from the Internet on Jan. 26, 2011. (4 pages).
"Silk flame ,fake, faux flame engines," http://www.amazingpartythemes. com/flame-fx/units/battery.htm., retrieved from be Internet on Jan. 26, 2011. (2 pages).
"Silk Flame Machine Hire," IA Sound & Light, retrieved from the internet on Jan. 26, 2011. (6 pages).
"Silk Flame," Wicked Beernut Home, Halloween Home, retrieved from the internet on Jan. 26, 2011 (7 pages).
"Silk Torches" retrieved from the internet on Jan. 26, 2011 (4 pages).
"Smart Candle," smart Candle, Asia Ltd., retrieved from the internet on Jan. 26, 2011. (2 pages).
"VEI Faux Flame V-0104 Vulcan's Fire Hanging silk Flame Effect," Minions Web, retrieved from the Internet on Jan. 26, 2011. (3 pages).
Battery Operated Flame Light Olympic Torch, Olympic Flame Torch, Caufields, retrieved from the internet on Jan. 26, 2011. (2 pages).
Chinese Patent Office, Notification of the First Office Action, with translation, in Chinese application No. 2017082101697260, dated Aug. 24, 2017 (9 pages).
European Patent Office, Communication pursuant to Article 94(3) EPC, in Application No. 12 870 606.6, dated Feb. 11, 2016 (5 pages).
European Patent Office, Communication pursuant to Article 94(3) EPC, in Application No. 16 205 327.6 dated Jan. 30, 2018 (4 pages).
European Patent Office, Communication with Extended European search report, Application No. 15165256.7, dated Mar. 21, 2016 (5 pages).
European Patent Office, Communication with extended European search report, in application No. 16205327.6-1757, dated Feb. 16, 2017 (8 pages).
European Patent Office, European Search Report, in Application No. EP12185984, dated Dec. 4, 2012. (2 pages).
European Patent Office, Supplemental European Search Report, in application No. EP12870606, dated Sep. 7, 2015 (6 pages).
Faux Flame Hanging Light, Kijiji, Ottawa, Canada, http://ottawa. kijiji.ca/c-buy-and-sell-furniture-lamps-lighting-Faux-Flam . . . retrieved from the internet on Jan. 26, 2011. (1 page).
LittleBrightLights.com, Flame Lights, Vaughan Safety, Inc. Company, Tuesday, Oct. 5, 2010; retrieved from the Internet on Jan. 26, 2011. (3 pages).
PCT, International Search Report, in Application No. PCTUS2009/054401, dated Oct. 16, 2009. (4 pages).
PCT, Notification Concerning Transmittal of International Preliminary Report on Patentability, in International application No. PCT/US2012/029730, dated Sep. 18, 2014 (7 pages).
PCT, Notification Concerning Transmittal of International Preliminary Report on Patentability, in International application No. PCT/US2012/061435, dated Sep. 18, 2014 (6 pages).
PCT, Notification of Transmittal of the International Search Report and the Written Opinion of the International Searching Authority, in International application No. PCT/US13/29730, dated May 13, 2013.
Shells: User's Guide, HP 9000 Computers, Hewlett Packard, HP Part No. B2355-90046, Printed in USA, Aug. 1992, Second Edition E0892. (432 pages).
The State Intellectual Property Office of the People'S Republic of China, Notification of the First Office Action, in Application No. 2012800730291, dated Oct. 29, 2015 (11 pages).
U.S. Pat. No. 8,132,936-file history. Publication date Mar. 13, 2012. (397 pages).
Intellectual Property Office, Combined Search and Examination Report under Section 17 an 18(3), in Application No. GB1814630.8 dated Feb. 25, 2019 (6 pages).

ARTIFICIAL CANDLE WITH MOVEABLE PROJECTION SCREEN POSITION

CROSS REFERENCE TO RELATED APPLICATIONS

This application is a continuation of U.S. patent application Ser. No. 16/460,761 filed on Jul. 2, 2019, which is a continuation of U.S. patent application Ser. No. 16/123,351 filed on Sep. 6, 2018, and issued as U.S. Pat. No. 10,352,517 on Jul. 16, 2019, which claims the benefit of U.S. Provisional Patent Application No. 62/555,154 filed on Sep. 7, 2018, the entireties of which are herein incorporated by reference.

BACKGROUND

Generally, this application relates to artificial (flameless) candles that use a non-flammable light source (such as one or more light-emitting diodes (LEDs)) to create the illusion of a flamed candle.

SUMMARY

According to certain inventive techniques, a flameless candle includes: a candle body forming an interior region, wherein the candle body includes an upper surface and an aperture in the upper surface; at least one light source positioned in the interior region of the candle body; a force-inducing portion (e.g., an electrical motor or an electromagnet) configured to alternatively induce a first mechanical force and a second mechanical force; and a projection screen (e.g., one that includes a flame shape). The projection screen is configured to receive the first mechanical force and responsively move to a first position with respect to the upper surface of the candle body and receive the second mechanical force and responsively move to a second position with respect to the upper surface of the candle body. When the projection screen is moved to the second position, the at least one light source is automatically energized such that a light is emitted onto the projection screen. When the projection screen is moved to the first position, the at least one light source is automatically de-energized such that the light is not emitted.

According to one technique, a base of the candle is resting on a substantially horizontal surface: when the projection screen is in the first position, the projection screen has a substantially horizontal orientation; and when the projection screen is in the second position, the projection screen has a substantially vertical orientation and extends upwardly from the upper surface of the candle body.

According to another technique, when a base of the candle is resting on a substantially horizontal surface, the projection screen is in a substantially vertical orientation when it is in both the first position and the second position. When the projection screen is in the first position, the projection screen may be within the interior region of the candle body.

According to one technique, the first mechanical force and the second mechanical force may be rotational forces provided to the projection screen such that the projection screen moves between the first position and the second position.

The candle may include an imitation wick extending upwardly from the upper surface of the candle body. The candle may include an ON/OFF actuator that, when actuated, causes the projection screen to transition between the first position and the second position. The candle may include a timer (e.g., a 24-hour timer) configured to periodically cause the projection screen to transition between the first position and the second position.

The candle may include a sensor to detect whether the projection screen is in the first position, wherein when the sensor detects that the projection screen is in the first position, the at least one light source is turned OFF. The candle may include a sensor to detect whether the projection screen is in the second position, wherein when the sensor detects that the projection screen is in the second position, the at least one light source is turned ON. A moveable lens may be interposed between the at least one light source and the projection screen.

Figure 1:
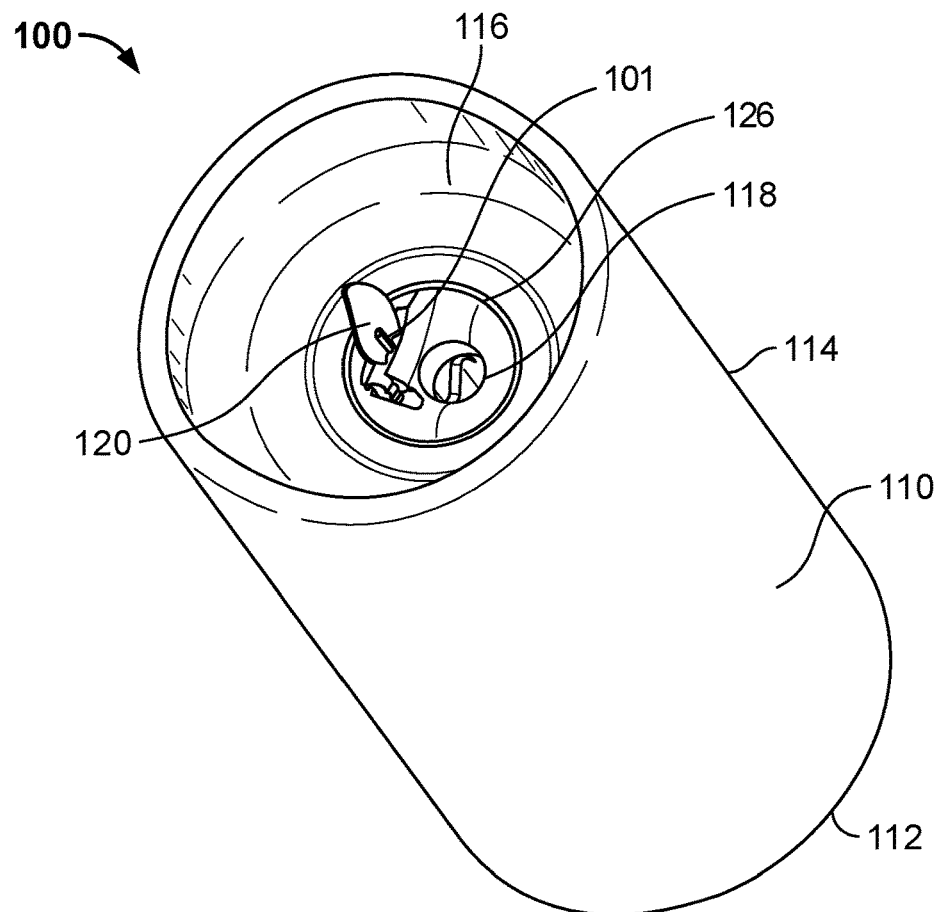
FIG. 1 illustrates a top perspective view of a flameless candle, according to certain inventive techniques.
Figure 2:
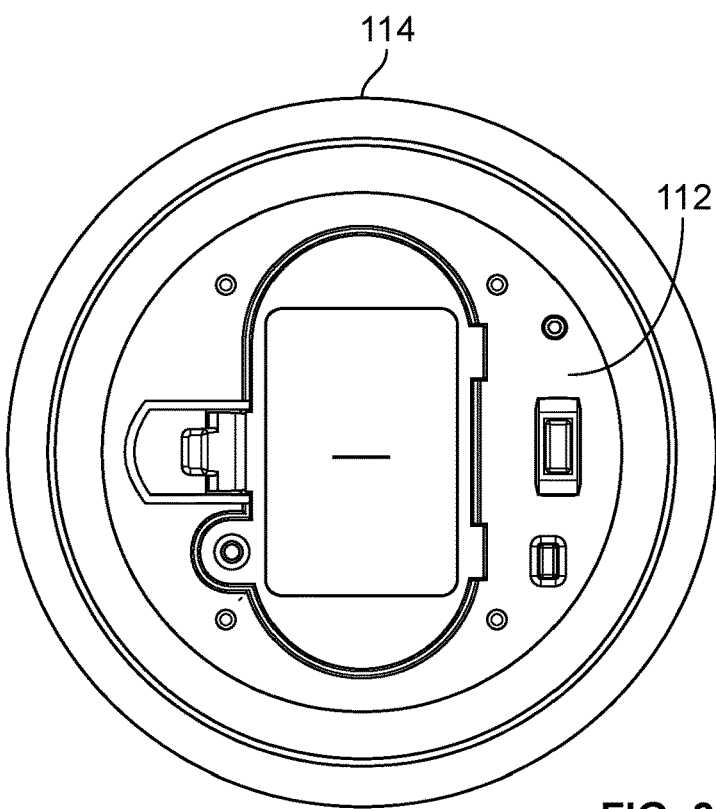
FIG. 2 illustrates a bottom plan view of a flameless candle, according to certain inventive techniques.
Figure 3:
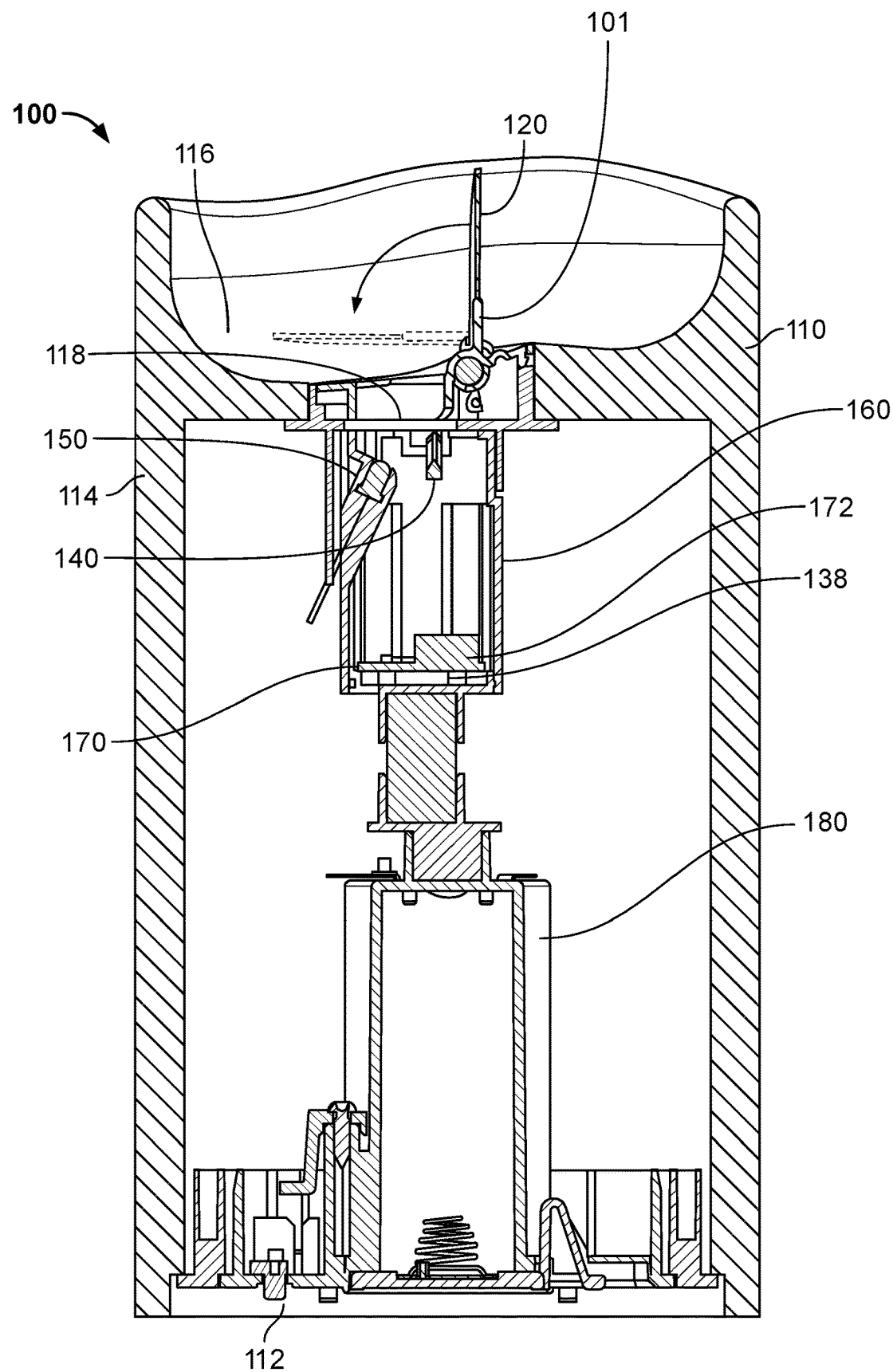
FIG. 3 illustrates a cross-sectional side view of a flameless candle, according to certain inventive techniques.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

As disclosed herein, an inventive flameless candle is disclosed. The candle can be turned OFF and ON and/or transitioned between an illuminated state and extinguished state. When in the illuminated state, the projection screen may be positioned in a vertical position and plainly visible. At least one light source may project onto the projection screen, thereby creating the illusion of a candle with a lit flame. When the candle is placed in the extinguished state, the flame screen is repositioned such that it is not visible or is less visible. The light source may also be turned OFF. An artificial wick may remain visible, even when the candle is in the extinguished state, thereby maintaining the illusion of a conventional, extinguished candle.

FIGS. 1-5B illustrate different views of a flameless candle 100, according to certain inventive techniques. The flameless candle 100 includes a candle body 110 and a projection screen 120. The candle body 110 may have a base 112, an upper surface 116, and a sidewall 114 extending between the base 112 and the upper surface 116. The candle body 110 may form a hollow interior region. The candle 100 may resemble a pillar candle (as shown), a taper candle, a votive, a tea light, other decorative candles, or the like. The candle body 110 may be translucent or include translucent regions. The translucence may be chosen so as to give the candle 100 the appearance of a conventional candle. Specifically, when light from a light source (e.g., one or more light-emitting components, such as LEDs) within the candle body 110 emanates through the sidewall 114 it may appear diffuse and have the character of light from a conventional candle. The candle body 110 may be formed of wax or plastic or other suitable material. When the candle body 110 is not formed of wax, it may include a waxen surface (for example, dipped in wax) to give the feel and translucent quality of real wax.

The upper surface 116 may include a concave recess (when viewed from above) to give the candle body 110 the appearance that the candle 100 has been used and some wax has been consumed by flame. The upper surface 116 may include an aperture 118. The aperture 118 may be located substantially along a primary axis in a vertical dimension of the candle body 110. The aperture 118 may allow light to pass from within the hollow interior region of the candle body 110 onto the projection screen.

The upper surface 116 may have a variety of different shapes. For example, the upper surface 116 may be shaped like a bowl or a portion of a bowl. Optionally, the upper surface 116 may include a flat bottom surface. The upper region of the sidewall 114 may have a varying height around the top perimeter of the candle 100. The upper surface 116 may form a backdrop whereby the rim of the sidewall 114 is higher in the back of the candle body 110 than it is in the front.

The projection screen 120 may be adjacent to, proximate to, and/or extend upwardly from (or through) the aperture 118 in the upper surface 116. The projection screen 120 may be offset with respect to or positioned off of a primary axis along a vertical dimension at which the aperture 118 is located.

The projection screen 120 may be made of plastic, wax, metal, or other suitable material. The projection screen 120 may be used with external light sources or for internally projected light—i.e., external and internal to the projection screen 120. For example, the projection screen 120 could have one or more light sources projecting light from below, thereby resulting in internally projected light. A light pipe may be employed to transfer the light from the light source to the projection screen 120 (either internally or externally to the projection screen 120). The projection screen 120 itself, or a portion thereof, may include a light pipe.

The projection screen 120 may include a flame shape. The projection screen 120 outer surface may have two faces, or three or more faces. The projection screen 120 may be round, spherical, cylindrical, egg shape or elliptical. When viewed from the front, the outer surface of the projection screen 120 may be convex, concave, flat, or irregular (for example, a mix of convex, concave, spherical, cylindrical, egg shape and/or flat regions). The projection screen 120 may include a portion or region that imitates a wick. Such a portion or region may be a painted region, a recessed region, or an aperture (i.e., a hole through the flame screen). The candle 100 may also include an artificial or imitation wick 101. The imitation wick 101 may extend upwardly from the upper surface 116 of the candle 100. The imitation wick 101 may always extend upwardly from the upper surface 116 of the candle 100, even when the candle 100 is turned OFF or placed in the extinguished state. This way, the candle 100 may maintain the illusion of a conventional candle, even when the light source 150 of the candle 100 are not generating or emitting any light. The projection screen 120 may include an aperture that is larger than an artificial wick 101, such that when the projection screen 120 is readily apparent, it substantially surrounds the artificial wick 101, thereby enhancing the illusion of a conventional wick that is burning.

The projection screen 120 may have a flame shape as depicted. The projection screen 120 may have two outer surfaces (front and back, as depicted), or three or more outer surfaces. When viewed from the front, the front outer surface may be convex, concave, flat, or irregular (for example, a mix of convex, concave, and/or flat regions). The projection screen 120 may include a portion or region that imitates a wick. Such a portion or region may be a painted region, a recessed region, or an aperture (i.e., a hole through the projection screen 120).

The projection screen 120 may be textured, smooth, opaque, and/or translucent. According to one technique, the translucency of the projection screen 120 is selected such that an illusion of a flame appears on both the front and rear outer surfaces. The projection screen 120 may have different translucencies and/or textures on the front and back of the exterior surfaces of the projection screen 120. Also, different regions on the same surfaces may have different translucencies, textures, and/or thicknesses.

Figure 5A:
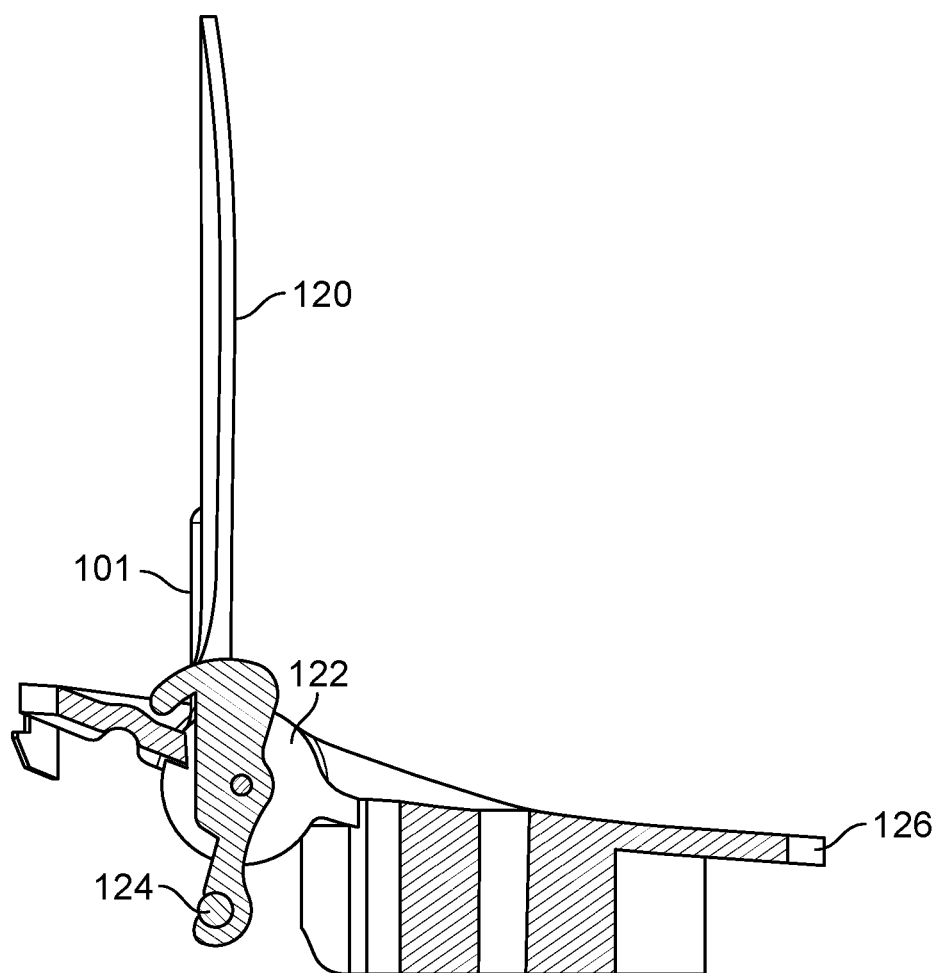
FIG. 5A illustrates a projection screen of a flameless candle in an illuminated state, according to certain inventive techniques.

When the candle 100 is turned ON or is placed in an illuminated state (for example, as depicted in FIG. 5A), the projection screen 120 may be positioned in a substantially vertical orientation from a horizontal plane (e.g., normal, unslanted resting surface for the candle). The candle 100 may be placed in an illuminated state when the projection screen 120 is moved (i.e., has been moved, is still moving, or will immediately be moved as a result of the candle being turned ON or being placed into an illuminated state) into a substantially vertical position in reference to the upper surface. In the illuminated state, the angle of the projection screen 120 in reference to a horizontal plane may vary between 75 to 105 degrees and therefore be substantially vertical. When the candle 100 is turned ON or is placed in an illuminated state, the projection screen is maintained in a substantially vertical position by having its weight balanced toward the back of the candle and resting on a support step.

In the illuminated state, the light source 150 (which may include one or more light-generating elements, such as LEDs) may be ON. The illuminated state may begin as soon as there has been an instruction (e.g., actuation of a user interface control) to place the candle 100 in the illuminated state, even though the light source 150 may not yet be energized. The projection screen 120 may act as diffuser and/or as screen to reflect and/or diffuse the light from the light sources 150.

Figure 5B:
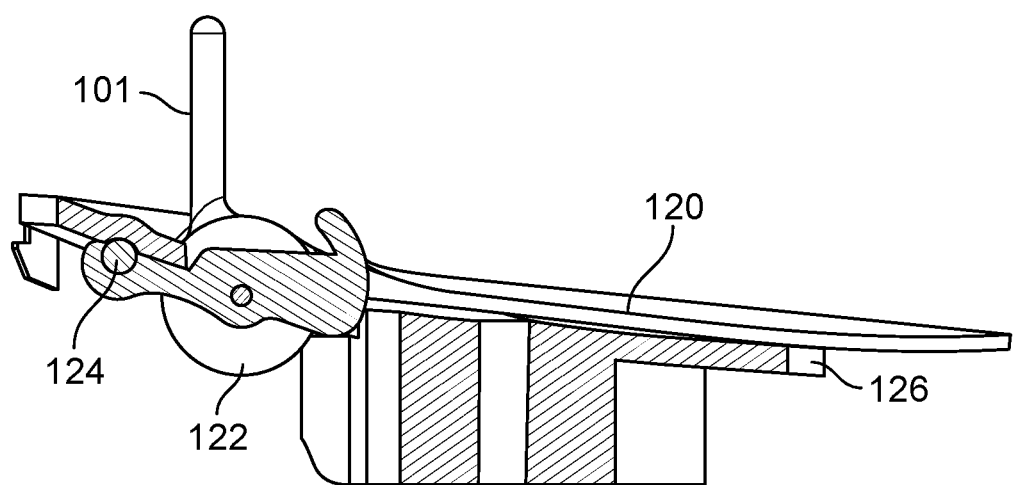
FIG. 5B illustrates a projection screen of a flameless candle in an extinguished state, according to certain inventive techniques.
Figure 6:
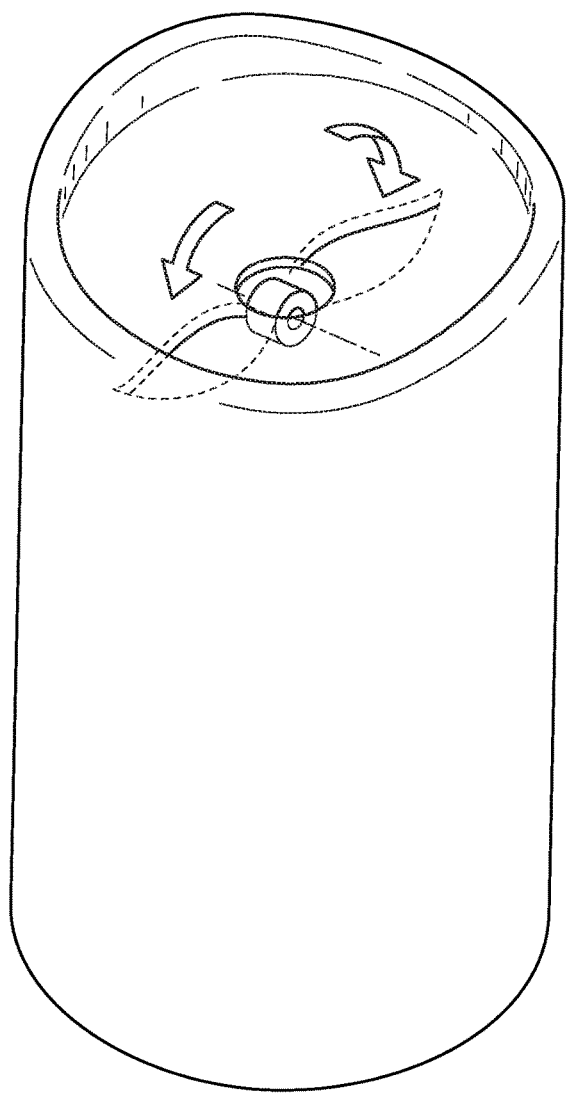
FIGS. 6-11 illustrate different flameless candle designs, according to certain inventive techniques.

The projection screen 120 may be positioned in a substantially horizontal orientation when the candle 100 is turned OFF or otherwise placed in an extinguished state (for example, as depicted in FIG. 5B), whereby the light source 150 is OFF. Alternatively, the projection screen 120 can be positioned substantially below the upper surface 116. The candle 100 may not be illuminated (at least not above the upper surface 116), when the projection screen 120 is moved (i.e., has been moved, is still moving, or will immediately be moved as a result of the candle being turned OFF or being placed into an extinguished state) in the substantially horizontal position in reference to a horizontal plane or substantially below the upper surface 116. Illumination may cease before the projection screen 120 transitions from the substantially vertical to substantially horizontal orientation. When not illuminated, the angle of the projection screen 120 in reference to the horizontal plane may vary between 15 to −15 degrees (i.e., substantially horizontal). In the extinguished state, the light source 150 projecting through the aperture 118 is OFF. Other light sources (e.g., user interface or internal illumination sources) may remain ON. When the candle 100 is turned OFF or is placed in an extinguished state, the projection screen 120 is maintained in a substantially horiziontal position by having its weight resting on the upper surface 116 or other structure, such as projection screen substructure 126.

The projection screen 120 may be moved between the positions by a force-inducing portion, such as electric motor 122. The electrical motor 122 may be a DC coreless brush motor. Other possible force-inducing portions may include an electromagnet or a manually driven system that may include a push-button, lever, or other type of actuator mechanically coupled with the projection screen 120.

The projection screen 120 may be fixed by a barrel hinge or other kinds of suitable hinge to the upper surface 116 (or to a hinge-receiving/hinge-mounting portion that does not move with respect to the upper surface 116, such as projection screen substructure 126). Alternatively, the projection screen 120 could be coupled to a rail or a linear guided channel. The hinge may include a pivot to transfer a rotational force at a lower position of the projection screen 120. The rotational force may be supplied by a force-inducing portion, such as electric motor 122.

The pivoting portion of the hinge may be connected directly or indirectly to the force-inducing portion (e.g., electric motor 122). If the pivot portion of the hinge is indirectly connected to the force-inducing portion, the power transfer may be accomplished through gear(s) or pulley(s) or any other component(s) that may transfer rotational power from the force-inducing portion to the pivot portion of the hinge.

The projection screen 120 may extend the opposite side of the pivot portion of the hinge to balance the weight of the projection screen 120. A counterweight 124 may also be attached or coupled to the projection screen 120. Gravity contributed by the counterweight 124 and/or projection screen 120 extension may then be used as a contributing force to move the projection screen 120 between positions (e.g., substantially vertical and substantially horizontal).

The force-inducing portion may include an electrical motor 122, electromagnets or any other suitable source that may generate the rotational power required to move the projection screen 120 from the substantially horizontal position to/from the substantially vertical position or, alternatively, to/from a position substantially above or substantially below the upper surface 116.

The candle 100 may include various components in addition to the candle body 110 and the projection screen 120, such as: a projection screen substructure 126 attached (e.g., movably attached) or otherwise coupled to the projection screen 120; a moving portion 130; a supporting portion 140 that supports the moving portion 130; a light source 150 (for example, one or more LEDs); a module housing 160, including a light source securing portion; and an electromagnet and control circuitry 170. The aforementioned components may be included in a module. For example, the electromagnet and control circuitry 170 may be located within or outside of the module housing 160. The assembled module may be inserted through the underside of the candle body 110 and seated into the aperture 118 of the upper surface 116. The candle 100 may also include a battery compartment 180, batteries (for example, two "C" batteries as depicted), and a battery door. These components may be located, at least partially or substantially, within the hollow interior region of the candle body 110.

The projection screen substructure 126 may be configured to be inserted into the aperture 118 of the upper surface 116 (for example, inserted from underneath or from above the upper surface 116). For example, the projection screen substructure 112 may have a stair-step profile with a lower tier having a larger radius than an upper tier. The substructure 126 may have a generally circular profile (for example, the tier(s) may be generally circular) when viewed from above, or it may have other shapes such as ovate, square, rectangular, etc. The lower tier of the substructure 126 may act as a stop to prevent over-insertion of the substructure 126 into the aperture 118. The aperture 118 may have a stair-step profile complementary to that of the substructure 126 tiers. This may facilitate accurate seating of the substructure 126 into the aperture 118. Once properly seated, the upper surface of the upper tier may be flush with or slightly below the upper surface 116. The substructure 126 may be secured to the candle body by friction fit, wax, mechanical means (for example, the substructure 126 having anchoring portions that anchor into a waxen material on the upper surface 116), or other epoxy.

The projection screen substructure 126 may have an aperture such that light projected from below can be projected onto the projection screen 120. As shown, the projection screen 120 is offset and positioned off of a primary axis along a vertical dimension at which the aperture 118 is located. Specifically, the projection screen 120 extends from an upper surface of a rim of the upper tier of the substructure 126. When the substructure is seated in the aperture 118, the light passing through the aperture of the substructure 126 also passes through the aperture 118 of the upper surface 116. The substructure 126 may have one or more engaging portions that engage with portions that generally are below the substructure 126. For example, the lower tier of the substructure 126 may have two engaging portions (each having an aperture) that engages with complementary portions on the module housing 160 (for example, spring tabs), such that the substructure 126 becomes a portion (for example, top portion) of the module 160.

The supporting portion 140 may support the moving portion 130, such that the moving portion can move in three dimensions. The supporting portion 140 may include a U-shape or V-shape region. The supporting portion 140 may nest in, be seated in, or connect to the module housing 160. As shown, the module housing 160 includes two slots that receive opposite ends of the supporting portion 140. The projection screen substructure 126 may secure the supporting portion 140 in the module housing 160 by forming a top to the receiving slots. The supporting portion 140 may be substantially rigid. It may include a tapered edge in all of or a portion of the top surface of the supporting portion 160. The tapered edge may come to a relatively sharp point. The moving portion 130 may rest on the top-surface tapered edge of the supporting portion 140. By having a tapered edge, freer movement of the moving portion 130 may be facilitated. For example, the tapered edge may allow for less friction and less interference with the moving portion 130. The tapered edge may permit at least three degrees of freedom of the moving portion 130. The region of the moving portion 130 that rests on the supporting portion 140 may also have a tapered edge (for example, tapered in the opposite direction, such that a wider region is higher than the narrower region that contacts the supporting portion).

The moving portion 130 may include a lens 132 and an arm 134. The moving portion 130 may optionally include an intermediate region 136 (for example, including an annular shaped region with an aperture as depicted) between the lens 132 and the arm 134 (or the lens 132 and arm 134 may be directly connected). The moving portion 130 may also include a magnet 138 seated, positioned, or located on the arm 134 (for example, a lower region of the arm 134). In this context, and as generally used herein, the word "on" is broadly understood to mean attached to, positioned on/in, located on/in, or the like. The moving portion may optionally include a bumper 139.

The lens 132 may include a transparent material such as acrylic. The lens 132 may have two or more surfaces (for example, a top surface and bottom surface as illustrated). The surfaces may include concave regions, convex regions (as shown for both surfaces), flat regions, or have an irregular surface (for example, a combination of concave, convex, and/or flat regions). When viewed from the top or bottom, the lens may have a substantially round shape, or other shapes are possible, such as ovate, square, or the like. The surfaces may touch each other, or may be separated by a lateral region (as depicted). When the moving portion 130 is in a resting position, the lens 132 may have a diagonal orientation (for example, 25 to 55 degrees with respect to a horizontal plane). According to one technique, the angle is approximately 40 degrees. Even when the lens 132 is moved to a maximum or minimum amount, it may still have a diagonal orientation (for example, 12 to 68 degrees). According to one technique, when the resting angle is approximately 40 degrees, the minimal angle is approximately 27 degrees and the maximal angle is approximately 53 degrees.

The arm 134 may extend generally downwardly, and it may be sized and arranged to act as a counterbalance to the lens 132 to maintain the lens 132 at a desired orientation when the moving portion 130 is in a resting position. The arm 134 may have an enlarged or heavier region towards the bottom. The arm 134 may have an area that accepts the magnet 138. For example, the arm 134 may have a recess on a bottom surface that is sized to receive the magnet 138. The magnet may be glued and/or press fit to the arm 134. The magnet 138 may include a material such as nickel or a nickel alloy.

The intermediate region 136 may abut the lens 132 and the arm 134. The intermediate region 136 may define an angle between the lens 132 and the arm 134, such as between 45 and 75 degrees (although this orientation may be achieved without the intermediate region 136). According to one technique, the intermediate region 136 may define an angle of approximately 60 degrees between the lens 132 and the arm 134. The intermediate region 136 may include a region that contacts the supporting portion 140. Such a region may include an aperture (for example, generally annular in shape, as shown) that substantially encircles the supporting portion 140. Such an arrangement may prevent the moving portion 130 from being constrained in movement by the supporting portion 140 (for example, prevents the moving portion from falling down or around or even coming out of the candle 100. There is no requirement, however, that the intermediate region 136 or the moving portion 130 have such an aperture. Other shapes for engaging the supporting portion 140 may be possible, such as an arch, a notch having an inverted V-shape (for example, a notch having a wider cut-out angle than the angle of taper on the upper surface of the supporting portion 140), or the like.

The bumper 139 may absorb impact of the moving portion if it comes in contact with other objects, such as the module housing 160. The bumper 139 may include a compressible material, such as rubber or ethylene propylene rubber. The bumper 139 may prevent a sound from being made when the moving portion 130 comes into contact with other objects. The bumper 139 may be located in a lower region of the moving portion 130, for example, on an enlarged region as shown in the figures. The bumper 139 may substantially or completely encompass such a region.

The light source 150 may include one or more light-emitting diodes (LEDs). The light source 150 may be selected to emit a color that resembles a color of a conventional candle flame. The lens 132 may also be colored to enhance or adjust the color of the projected light from the light source 150. For example, the lens 132 may include a colored region and an uncolored region (or it may be entirely colored or uncolored). In the example of a colored region, such a region may be blue in color (e.g., painted, printed, a sticker, colored epoxy, or the like). For example, areas on the rim of the lens 132 may be tinted or otherwise colored blue to cause the outer regions of the projected light to be bluish in color. When projected on the projection screen 120, this may enhance the illusion of a conventional candle flame.

The light source 150 may be arranged to generate a light having varying intensity (for example, to cause a flickering effect). The perceivable intensity of the light source 150 may vary by no more than ±25% of the average power as measured in lumens. By perceivable intensity, it is understood that this is the intensity recognizable by the human eye. The actual instantaneous power delivered to a light source 150 may be much more than 25%, such as for example by using pulse-width modulation techniques in which the power to a light source 150 is switched ON and OFF very rapidly.

The light source 150 may have a lens separate from lens 132. For example, the light source 150 may include a type of a conventional LED package that includes a lens where the light exits the package. The light source 150 may have an embedded circuit, such as one including a microprocessor and associated circuitry (e.g., an oscillator) that causes the flickering effect (or other effects, such as fade in/out, color changing, or the like). The light source 150 (independent of the lens 132 in the moving portion 130) may be configured to generate a beam of light having an associated beam-width—for example, a beam-width between 37 and 67 degrees. According to one technique, the beam-width is approximately 52 degrees.

The light source 150 may be mounted in the module housing 160. It may be secured, for example, with a light source securing portion. The light source 150 may be mounted at an angle, such as 50 to 80 degrees as measured from the horizontal plane. According to one technique, the light source is mounted at a 65 degree angle with respect to the horizontal plane. Such an angle may be measured from the horizontal plane to a central axis of the emitted beam of light. Thus, the light source 150 may be positioned to project light upwardly and diagonally, such that the light travels from the light source 150, through the lens 132, through the aperture 118 of the upper surface 116 of the candle body 110, and onto an outer surface of the projection screen 120. When viewed straight down from the top of the candle 100, the light source 150 and/or the lens 132 may not be visible through the aperture 118 (for example, these component(s) may not be located directly below the aperture. The light source 150 may be statically mounted as shown (i.e., the light source 150 does not move with respect to the candle body 110), or it may move (for example, vibrate or oscillate) by mechanical or electromagnetic means. The light source 150 and/or its package may be separated by a distance from the lens 132 (i.e., not abutting the lens 132).

A light pipe (for example, fiber optic or Lucite) may be used to provide flexibility in the positioning of the light source 150. The light pipe may receive light emitted from the light source 150 and project the light at an appropriate location. A prism may also be used to receive light projected from the light source 150 to alter the angle at which light is projected onto the projection screen 120. For example, a prism may bend light at a selected angle, such as 45 degrees.

The electromagnet 172 and control circuitry 170 may be positioned below the arm 134 of the moving portion 130, spaced by a distance. The electromagnet 172 may be driven by the control circuitry 170. The control circuitry 170 may also be electrically connected to the light source 150 and the user interface. The control circuitry 170 may be electrically connected or control and receive inputs from all electrical components in the candle 100. The control circuitry 170 may include a microprocessor that executes instructions to drive the electromagnet 172 and/or control the light source 150 in the specific manners described herein (for example, cause the light source 150 to flicker). The control circuitry 170 may also include other analog or digital components to control the operation of the candle 100, such as a state machine or oscillator to drive the electromagnet 172 and/or the light source 150. The control circuitry 170 may receive power from batteries.

The electromagnet 172 may include a wire coil. The coil may include wire or traces on a printed circuit board. The control circuitry 170 may alternately energize the electromagnet 172 positively (for example, a first polarity) and negatively (for example, a second polarity) such that it has alternating polarities over time. This may cause the electromagnet 172 to successively push (repel) and pull (attract) the magnet 138 over time, thereby causing the moving portion to move back and forth. The electromagnet 172 may be energized more than 50% of the time (either positively energized or negatively energized) when the moving portion 130 is in motion. The control circuitry 170 may include two or more modes (for example, the modes selectable through a user interface actuator like a switch or push-button) for driving the electromagnet 172. One mode may energize the electromagnet 172 to a lesser degree (less aggressive) and another mode may energize the electromagnet 172 to a greater degree (more aggressive). For example, the amount of current supplied to the electromagnet 172 by the control circuitry 170 may be smaller in the less aggressive mode and greater in the more aggressive mode. The amount of current supplied to the electromagnet 172 may vary gradually over time. For example, the amount of current supplied to the electromagnet 172 may be a sine wave over time—alternating between negative and positive currents to generate positive and negative magnetic polarities in the electromagnet 172.

A battery compartment 180 may house one or more batteries 182 (for example, two "C" batteries). A battery compartment door may releasably engage with the base 112 to secure and allow access to the batteries through one or more apertures in the base 112. The battery compartment 180 may be located below and may physically support the module or components thereof.

A user interface may be accessible at or through the base 112. The user interface may include one or more controls, such as switches, buttons, knobs, actuators, or other components. A user may interact with the user interface to control the operation of the candle. The user interface may be electrically connected to the control circuitry 170 and/or the batteries. For example, an ON/OFF switch may disconnect power from reaching the control circuitry 170, or the status of such a switch may be sensed by the control circuitry 170 to cause it to shut down or restart operations of the candle 100. The user interface may include a timer control which is sensed by the control circuitry 170 to periodically shut down and restart (for example, 5 hours ON, and 19 hours OFF, or the like).

The user interface may include a control that adjusts the brightness or the flickering nature of the light source 150. The user interface may include a control that causes the color of the light source 150 to change—either to a new color statically, or by roaming through different colors (or ceasing roaming). The user interface may also include a control that adjusts, stops, or starts the movement of the moving portion 130 (for example, by adjusting the operation of the electromagnet 172 whereby the strength or pattern of energization may be altered). Generally, all of the features disclosed herein that relate to the operation of the candle 100 may be selectively activated, deactivated, or adjusted by interaction with components or actuators in the user interface. For example, if the candle 100 has a speaker and generates sound, the sound can be turned ON/OFF or the volume can be adjusted via user interface components(s). As another example, if the candle 100 includes a fan, user interface component(s) can cause the fan to turn ON/OFF and/or change the speed or direction of the fan.

The user interface may also include a control that places the candle 100 into an extinguished or illuminated state as described herein. The timer control may periodically place the candle 100 into an extinguished or illuminated state (for example, 5 hours illuminated, and 19 hours extinguished, or the like).

In addition to a user interface, some or all of the functionality disclosed herein can be affected through one or more wireless control modalities—for example, infrared, Bluetooth, WiFi, etc. A suitable remote would be able to send and/or receive signals through antenna(s) to control operations of the candle 100.

The candle 100 may operate in the following manner. A user may turn the candle 100 ON through a user interface positioned proximate the base 112. The projection screen 120 may move into a position corresponding to the illuminated state. The control circuitry 170 may provide power to the electromagnet 172 and/or the light source 150. Alternately, light source 150 may receive power independently from the control circuitry 170. The light source 150 may be selectively or intermittently energized (intermittently in a relatively quick manner, rather than normal ON/OF user-initiated transitions of the light source 150) so as to provide a flickering effect as discussed above.

Figure 4A:
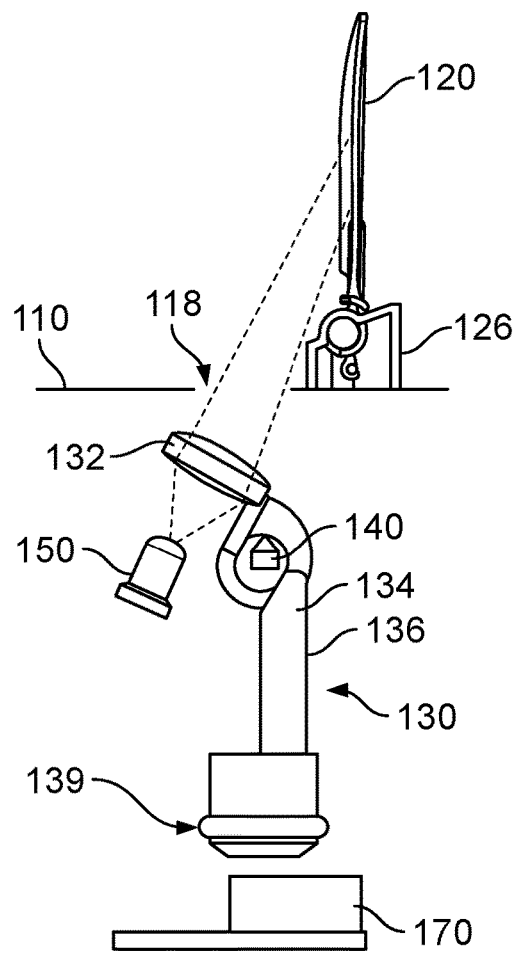
FIGS. 4A and 4B illustrate a moving lens altering a beam of light projected onto a projection screen, according to certain inventive techniques.
Figure 4B:
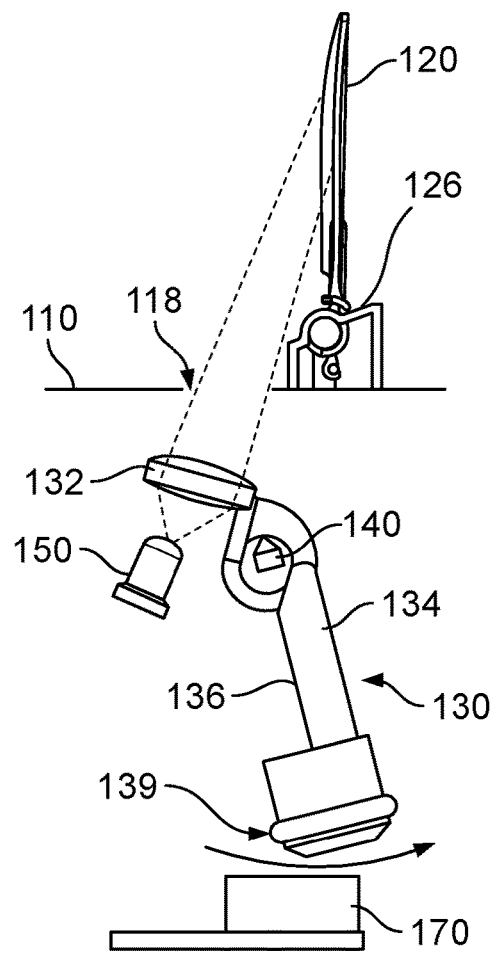

The energized light source 150 may emit a light beam having a central axis at an upward angle towards the projection screen 120. The angle may be 50 to 80 degrees as measured from the horizontal plane. According to one technique, the angle is 65 degrees with respect to the horizontal plane. The light travels from the light source 150, through the aperture 118 in the upper surface of the candle body 110, and onto the projection screen 120. The light beam may be refracted once or twice or even more times by the lens 132. As depicted, the light is refracted a first time when the light strikes the bottom surface of the lens 132 and a second time when the light strikes the top surface of the lens 132. The focal length of the altered light beam may vary as the moving portion 130 moves (thereby causing the distance and/or positioning between the light source 150 and the lens 132 to vary). This is depicted in FIGS. 4A and 4B. Both the position of the light beam on the projection screen 120 and the focal length may be altered as the moving portion 130 moves. Specifically, when the moving portion 130 is in a first position, the light beam will project onto a first region of the external surface of the projection screen 120. It will have a first focal length. When the moving portion 130 is in a second position, the light beam will project onto a second region of the external surface of the projection screen 120, and the beam may have a second focal length different from the first focal length. First and second focal points defining the respective first and second focal lengths may be located beyond the projection screen 120. In other words, the projection screen 120 may intersect the light beam(s) before the focal point(s). The first and second regions may overlap or may be completely different. The regions on the projection screen 120 may vary in a vertical and/or horizontal dimension. The size of the regions may vary.

The control circuitry 170 may drive the electromagnet 172 by turning it ON and OFF and/or by reversing its polarity. According to one technique, polarity is successively reversed to push and pull the magnet 138 in the moving portion 130. The rate of pushing and pulling may be greater than the natural oscillation period of the moving portion 130. For example, the natural oscillation period of the moving portion 130 may be approximately 500 ms while the rate of push or pull may be between approximately 1-4 s. Thus, the ratio of push or pull time to the natural oscillation period may be between 2:1 and 8:1. The superposition of these two frequencies may result in a modulating beat that induces a substantially erratic movement to the lens 132. The duty cycle of the push/pull may be approximately 50% or may be set so the push or pull cycle is longer than the other one. The electromagnet 172 may be energized according to a predetermined or pseudorandom pattern and may be driven according to execution of a software program accordingly (for example, to cause pushing or pulling or to selectively energize and deenergize the electromagnet 172).

The push/pull caused by the electromagnet 172 may be achieved by driving the electromagnet 172 with a wave, such as a sine wave, a square wave, a sawtooth wave, or the like. It may be possible to have more complicated driving waves, such as waves that are a combination of a plurality of frequency sine wave components. By generating and combining multiple sine waves, it may be possible to generate a more complex, natural effect with multiple "beats" due to the phase characteristics of the multiple sine waves.

In addition to moving the illuminated region about on the projection screen 120, the light source 150 may also flicker as discussed. The degree of flickering, however, may be limited such that flickering is apparent through the translucent candle body 110, but not on the projected light on the projection screen 120. By limiting the apparent flickering power, this can be achieved. For example, by limiting the difference between maximum-to-average and minimum-to-average flickering by no more than approximately 25% as measured in lumens may achieve this effect. For the example of a relatively smaller candle (for example, 1.75" diameter), intensity may vary between approximately 0.9-1.5 lumens. For the example of a relatively larger candle (for example, 4" diameter), intensity may vary between approximately 2.6-4.4 lumens.

There may be more than one light source 150 (for example, ones with different colors, such as one that is blue and another that is yellow) and/or more than one moving lens 132 that operate in similar fashions. For example, there may be two light sources 150 and one lens 132. Light projected from one of these light sources 150 may be altered by the lens 132 and the other one may project directly onto the projection screen 120 without passing through a lens 132. As another example, both light sources 150 would project light through one lens 132 or through two respective lenses 132. According to yet another example, two or more lenses 132 may be arranged in series such that one beam of light passes through all of the lenses 132.

According to one technique, one light source 150 is positioned to project light onto a rear exterior surface of the projection screen 120 and another light source 150 is positioned to project light onto a front exterior surface of the projection screen 120. The light sources 150 may have different colors. The rearward light source 150 may project a blue light (either by virtue of being a blue LED, or by tinted lenses, coverings, etc.). The rearward light source 150 may project a non-moving beam of light onto the projection screen 120. The forward light source 150, by contrast, may project a light that is altered by a moving lens 132 as discussed above.

In addition to or in lieu of the electromagnet 172 and magnet 138 arrangement, the moving portion 130 may be driven by other mechanical means, such as, for example, driven air (a fan), a vibrating transducer, a spring, and/or one or more electric motors. Like the magnetic push/pull arrangement of the electromagnet 172 and magnet 138, motor(s) may physically push/pull the moving portion 130. Or such a motor arrangement may only push or pull the moving portion 130 and rely on its natural oscillation to fall back and move about. One technique for accomplishing motor-driven movement of the moving portion 130 is to have a motor shaft with a projection that contacts the moving portion 130. The shaft may rotate in one direction only, or may rotate both clockwise and counterclockwise. The projection would consequently push the moving portion 130 in only one direction when the shaft rotates in only one direction, or push the moving portion 130 in two directions when the shaft rotates both clockwise and counterclockwise.

According to another technique, several electromagnets (for example, at least three electromagnets) may be used to control the moving portion 130. The stator windings may generate a varying alternate magnetic field (for example, in response to being driven by a sine wave or a complex frequency with multiple sine wave components) to influence the magnet to make the arm move in multiple directions. Multiple outputs of a microprocessor or other suitable circuitry, for example, may be used for multiple H-bridge drivers to induce a variable-frequency alternating current into each of the motors' stator winding. The amplitudes of the movement in multiple directions may vary asynchronously, resulting in the induction of a variable beat (created by the combination of multiple frequencies). Such a frequency may be a lower frequency than the self-oscillating frequency of the moving portion 130. The lens 132 movements may be most of the time controlled by the servomotor driver and not by the self-oscillating period of the moving portion 130. The form of the shaft's bearings may also vary to provide an erratic movement.

According to other techniques, the candle 100 may play music and/or may be scented. The candle 100 may have a night-light control that, when actuated, causes the candle 100 to go into a low power mode, thereby emitting less light from the light source 150 than in the regular mode.

Figure 12:
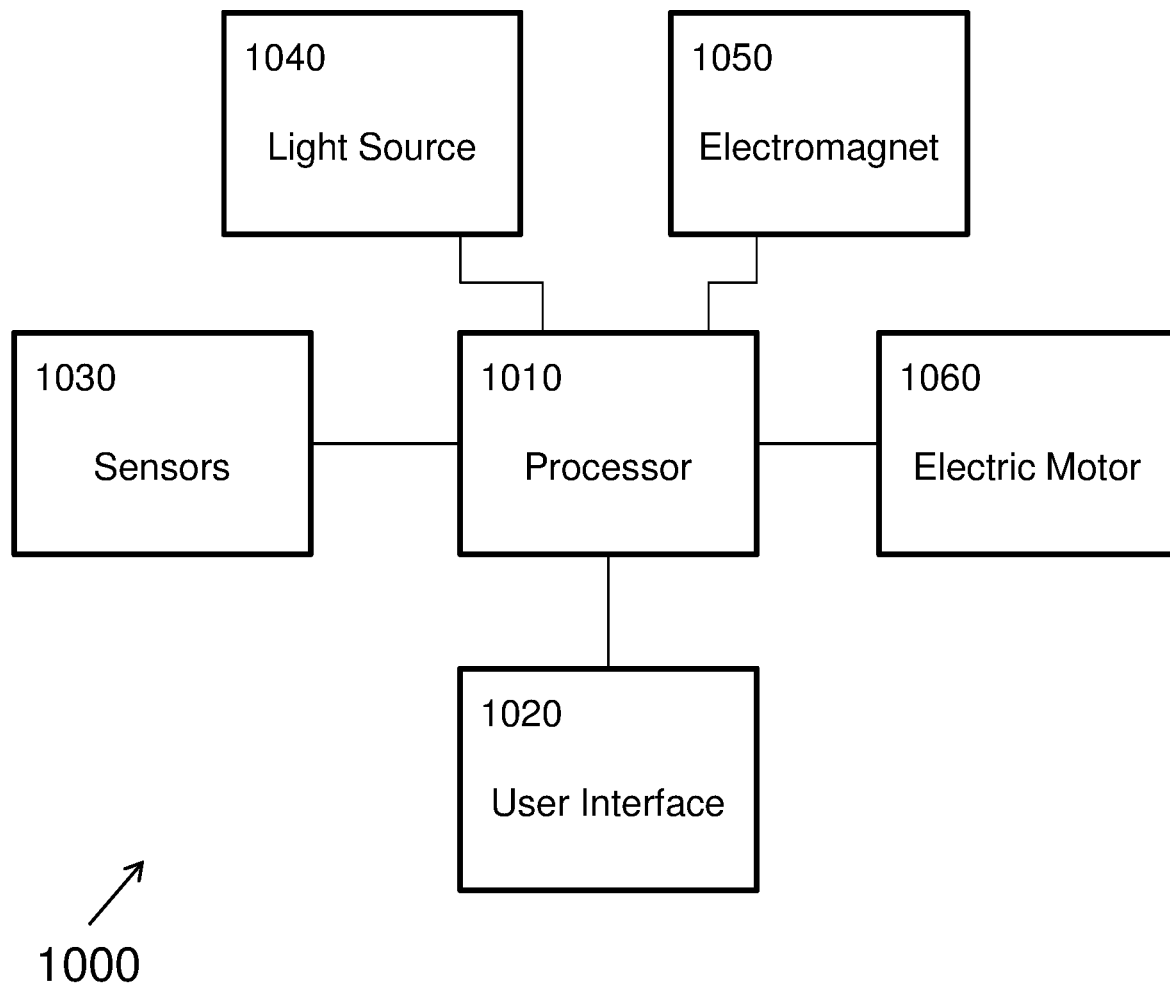
FIG. 12 is a block diagram of electrical components in a flameless candle, according to certain inventive techniques.

FIG. 12 illustrates a block diagram of an electrical system 1000 of an inventive flameless candle (e.g., candle 100), according to certain inventive techniques. The system 1000 may include a processor 1010, a user interface 1020, one or more sensors 1030, one or more light sources 1040 (e.g., light source 150), an electromagnet 1050, and/or an electric motor 1060. The electromagnet 1050 and/or electric motor 1060 may suitably be replaced by other force-inducing components as described herein. The system 1000 may be powered by one or more batteries in the candle or by a power source located externally from the candle (e.g., transformer).

The processor 1010 may include one or more processors, and may be capable of executing machine-readable instructions. Such instructions and other data used in conjunction with processing by the processor 1010 may be stored in one or more memories (not shown)—e.g., RAM, ROM, Flash, EEPROM, etc. The processor 1010 may receive inputs from the user interface 1020 and/or the sensors 1030. The processor 1010 may control operation of the light source 1040, the electromagnet 1050, and/or the electric motor 1060.

The user interface 1020 (such as the one described above) may include controls, such as switches or other actuators, and the processor 1010 may detect actuation of these controls. One such control may indicate to the processor 1010 (through an input to the processor 1010) to put the candle into an illuminated state. According to another technique, such a control may switch power ON/OFF to the processor 1010, thereby turning the processor 1010 ON/OFF, accordingly. Further according to this technique, when the processor 1010 is first turned ON, it places the candle into an illuminated state. When the processor 1010 is turned OFF, the candle goes into an extinguished state.

In addition to the user interface 1020, some or all of the functionality disclosed herein can be affected through one or more wireless control modalities—for example, infrared, Bluetooth, WiFi, etc. A suitable remote (dedicated remote, smart phone, etc.) may be able to send and/or receive signals through antenna(s) to control operations of the candle. Messages received at the candle may be processed by processor 1010, which then causes the desired effect.

The processor 1010 may control the light source 1040 (one or more light-generating elements, such as LEDs), the electromagnet 1050, and/or the electric motor 1060. One or more of these components may be controlled as discussed above in conjunction with candle 100.

The sensors 1030 (one or more sensors) may include various types. For example, a heat sensor may detect heat source near the candle and trigger the transition to the illuminated state via the processor 1010. A sound sensor may detect specific sounds near the candle and trigger the transition to an illuminated or extinguished state via processor 1010.

According to one technique, one or more position sensor (e.g., mechanical contact switch) may detect the position of the projection screen. The status of such position sensor(s) may be detected by the processor 1010, thereby causing the candle to transition to an illuminated or extinguished state according to the position sensor. According to this technique, the projection screen may be moved manually to different positions, and the position sensor(s) may detect one or more of the different positions. After detection, the candle may transition via the processor 1010 to the illuminated or extinguished state. Upon no detection, the candle may transition to a different one of the illuminated or extinguished state. Optionally two position sensors may be employed, one that detects the first projection screen position (e.g., substantially vertical) and one that detects the second flame screen position (e.g., substantially horizontal).

Figure 7:
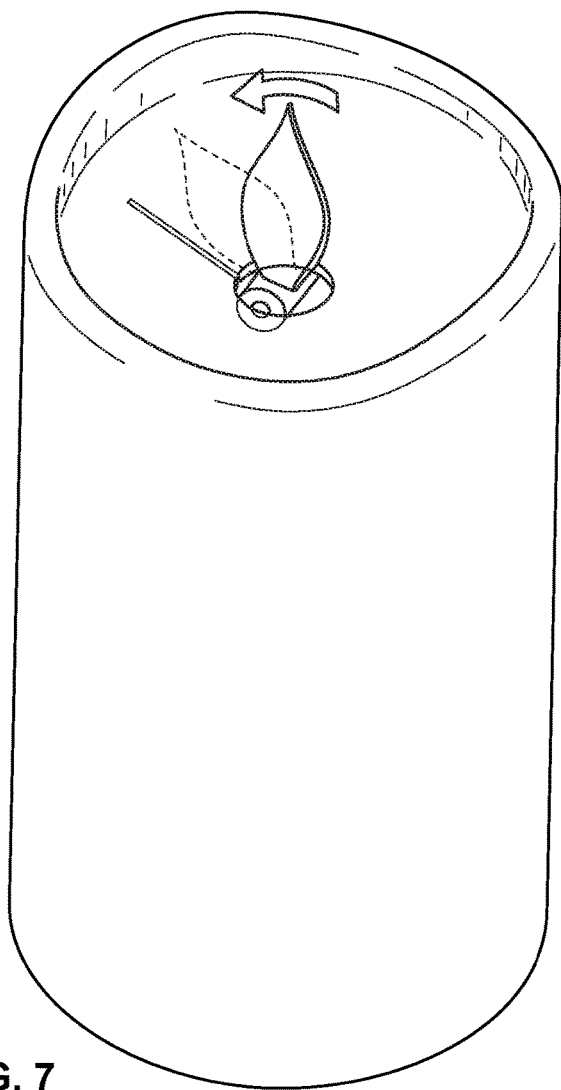
Figure 8:
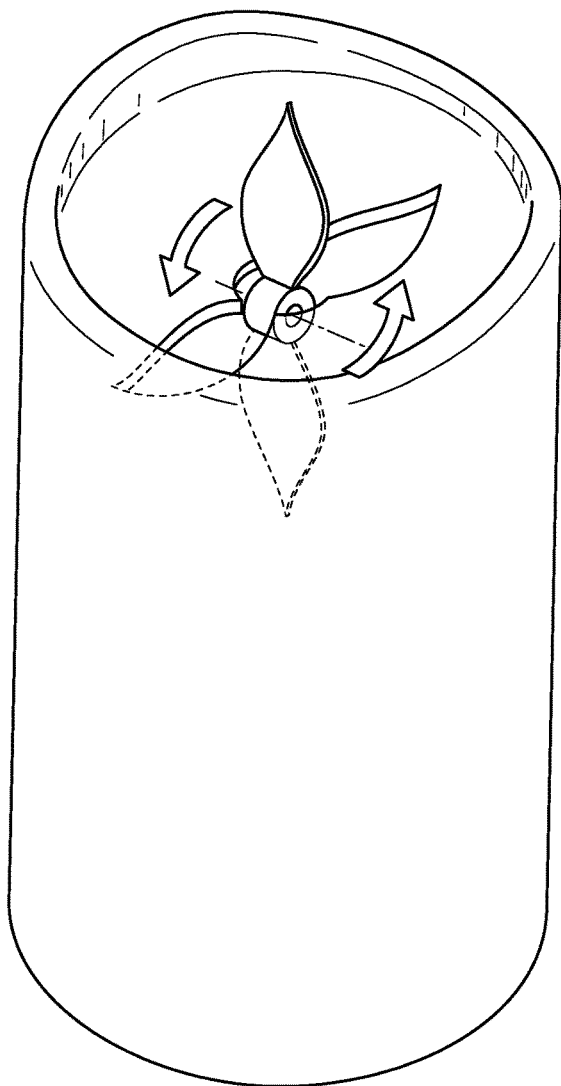
Figure 9:
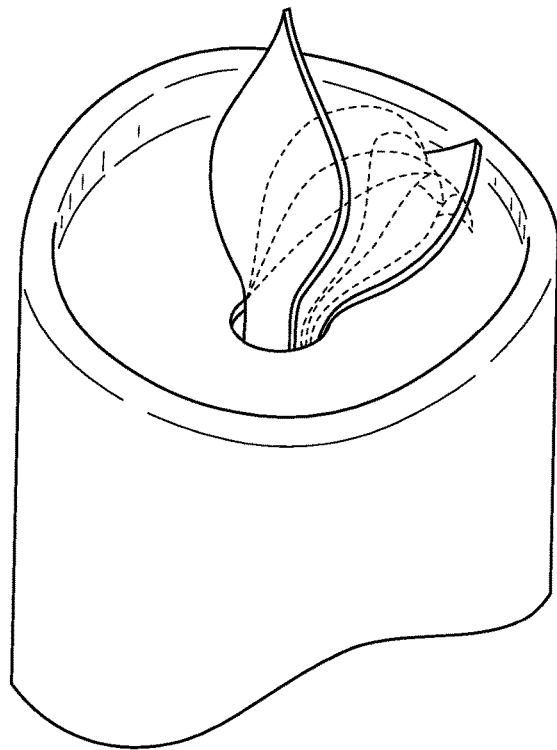
Figure 10:
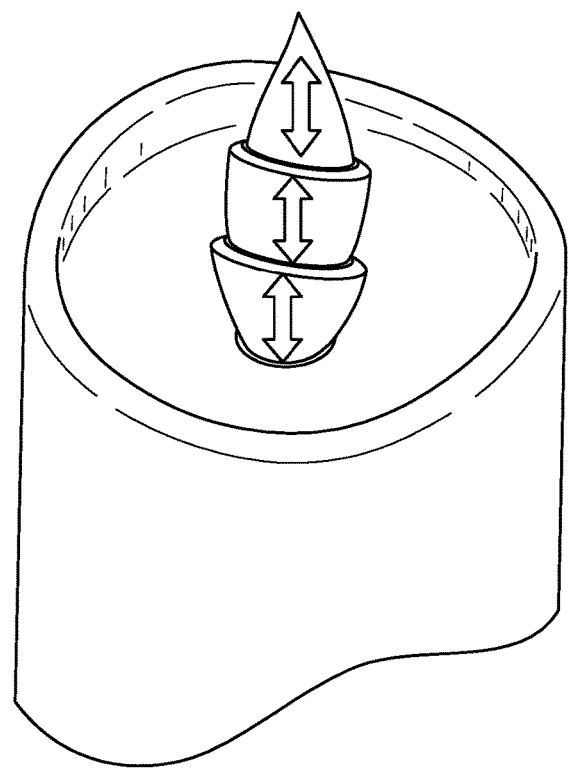

FIGS. 6-11 illustrate alternative embodiment of a flameless candle. According to FIG. 6, the projection screen may have two different extinguished positions (e.g., two substantially horizontal positions). As depicted in FIG. 7 the projection screen may pivot substantially to the horizontal position or within the hollow region of the candle (e.g., through a slot as shown) along an axial dimension that is substantially 90 degrees from that shown in FIG. 6. As illustrated in FIG. 8, the projection screen may rotate (for example 180 or 360 degrees) so when it is in an extinguished state, the projection screen is in the interior hollow region of the candle body. As depicted in FIG. 9 the projection screen may be flexible and folds to a substantially horizontal position then its base is generally flat. When in the ON position the base of the projection screen may be curved, thereby bringing it into a substantially vertical position. As shown in FIG. 10, the projection screen may be telescoping, such that it collapses when in an extinguished state and extends upwardly when in an illuminated state.

Figure 11:
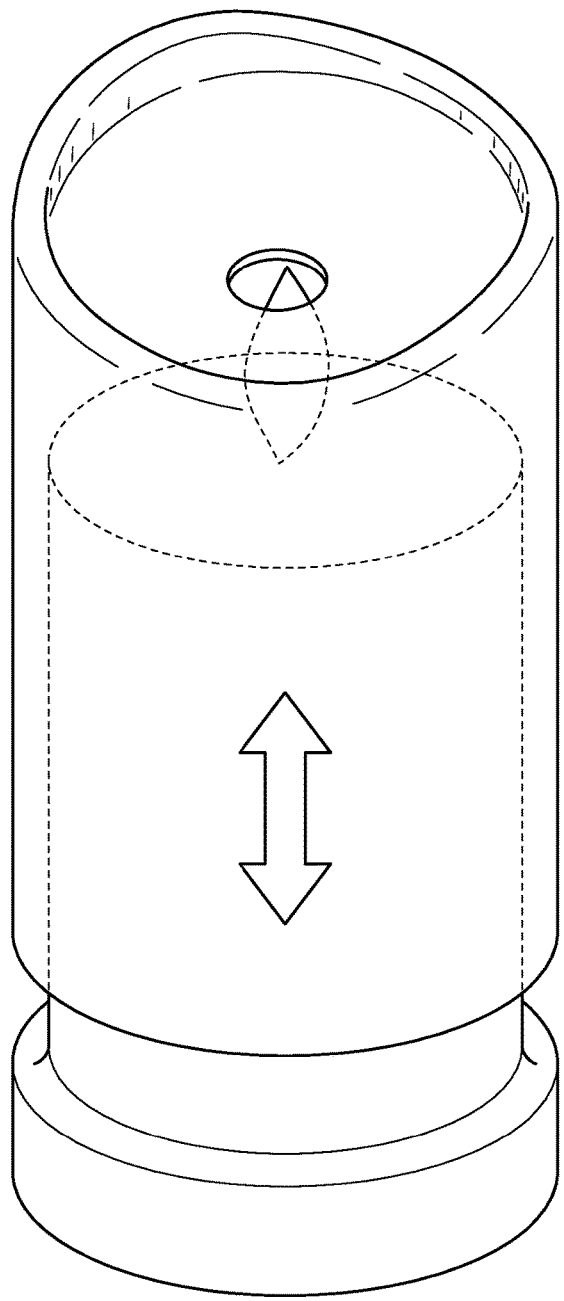

As illustrated in FIG. 11, the projection screen may be static but still have two different positions with respect to the upper surface of the candle. This is by virtue of the candle body and the upper surface being moveable (e.g., upwardly and downwardly) with respect to the static projection screen. According to this embodiment, the projection screen may be substantially inside the candle body when the candle body is in an elevated position. Correspondingly, the projection screen may extend upwardly from the upper surface of the candle body when the candle body is in a downward position (i.e., the candle body is moved downwardly from the elevated position).

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A flameless candle comprising:
a candle body forming an interior region, wherein the candle body includes an upper surface and an aperture in the upper surface;
a force-inducing portion configured to induce a force;
a projection screen configured to:
receive the force and responsively move to a first position with respect to the upper surface of the candle body; and
move to a second position with respect to the upper surface of the candle body by assistance of a gravitational force acting on the projection screen;
at least one light source configured to project a light towards the projection screen, such that the projection screen receives the light internally and transmits the internally projected light; and
wherein:
when the projection screen is moved to the first position, the at least one light source is automatically energized such that the light is received by the projection screen; and when the projection screen is moved to the second position, the at least one light source is automatically de-energized such that the light is not emitted.

2. The flameless candle of claim 1, wherein the light is projected by the at least one light source into a region internal to the projection screen.

3. The flameless candle of claim 2, wherein the at least one light source is positioned below the projection screen.

4. The flameless candle of claim 2, further comprising a light pipe configured to transfer the light from the at least one light source to the region internal to the projection screen.

5. The flameless candle of claim 1, wherein the projection screen comprises a flame shape.

6. The flameless candle of claim 1, wherein when a base of the candle is resting on a substantially horizontal surface, the projection screen is in a substantially vertical orientation when it is in both the first position and the second position.

7. A flameless candle comprising:
   a candle body forming an interior region, wherein the candle body includes an upper surface and an aperture in the upper surface;
   a force-inducing portion configured to induce a force;
   a projection screen configured to:
      receive the force and responsively move to a first position with respect to the upper surface of the candle body; and
      move to a second position with respect to the upper surface of the candle body by assistance of a gravitational force acting on the projection screen; and
   at least one light source configured to project a light towards the projection screen, such that the projection screen receives the light internally and transmits the internally projected light;
   wherein the projection screen has a substantially vertical orientation when in both the first position and the second position.

8. The flameless candle of claim 7, wherein the light is projected by the at least one light source into a region internal to the projection screen.

9. The flameless candle of claim 8, wherein the at least one light source is positioned below the projection screen.

10. The flameless candle of claim 8, further comprising a light pipe configured to transfer the light from the at least one light source to the region internal to the projection screen.

11. The flameless candle of claim 7, wherein the projection screen comprises a flame shape.

* * * * *